United States Patent
Salami et al.

(10) Patent No.: US 11,691,916 B2
(45) Date of Patent: *Jul. 4, 2023

(54) MORTAR COMPOSITION CONTAINING IRON OXIDE

(71) Applicant: KING FAHD UNIVERSITY OF PETROLEUM AND MINERALS, Dhahran (SA)

(72) Inventors: Babatunde Abiodun Salami, Dhahran (SA); Megat Azmi Megat Johari, Universiti Sains (MY); Mohammed Maslehuddin, Dhahran (SA); Zainal Arifin Ahmad, Universiti Sains (MY)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/405,533

(22) Filed: Aug. 18, 2021

(65) Prior Publication Data

US 2021/0380478 A1 Dec. 9, 2021

Related U.S. Application Data

(63) Continuation of application No. 16/522,200, filed on Jul. 25, 2019, now Pat. No. 11,168,027.

(51) Int. Cl.
C04B 26/00 (2006.01)
C04B 18/08 (2006.01)
C04B 18/02 (2006.01)

(52) U.S. Cl.
CPC ............ C04B 26/003 (2013.01); C04B 18/02 (2013.01); C04B 18/087 (2013.01)

(58) Field of Classification Search
CPC ........... C04B 7/44; C04B 14/06; C04B 18/02; C04B 18/087; C04B 26/00; C04B 26/003; C04B 28/26; C04B 2201/50; Y02A 30/30; Y02W 30/91
See application file for complete search history.

(56) References Cited

U.S. PATENT DOCUMENTS

| | | | |
|---|---|---|---|
| 8,057,594 B2 | 11/2011 | Doyoyo et al. | |
| 10,221,097 B1 | 3/2019 | Al-Kutti et al. | |
| 11,168,027 B2 * | 11/2021 | Salami ................. | C04B 28/021 |
| 2021/0363059 A1 * | 11/2021 | Salami ................. | C04B 26/003 |
| 2021/0380479 A1 * | 12/2021 | Salami ................. | C04B 18/087 |
| 2021/0387914 A1 * | 12/2021 | Salami ................. | C04B 18/02 |
| 2021/0395147 A1 * | 12/2021 | Salami ................. | C04B 18/087 |

FOREIGN PATENT DOCUMENTS

CN 106220101 A 12/2016
WO WO 2012/083255 A1 6/2012

OTHER PUBLICATIONS

Thomas et al "Sustainable concrete containing palm oil fuel ash as a supplementary cementitious material—A review", Renewable and Sustainable Energy Reviews 80, pp. 550-561. (Year: 2017).*

M.J.A. Mijarsh, et al., "Synthesis of geopolymer from large amounts of treated palm oil fuel ash: Application of the Taguchi method in investigating the main parameters affecting compressive strength", Construction and Building Materials, vol. 52, Feb. 2014, pp. 473-481.

Babatunde Abiodun Salami, et al., "Performance of POFA-Based Alkali-Activated Mortar Exposed to Elevated Temperatures", International Journal of Current Science, Engineering & Technology, vol. 1, Issue 1, Mar. 2018, pp. 147-153.

Ziyad Kubba, et al., "Impact of curing temperatures and alkaline activators on compressive strength and porosity of ternary blended geopolymer mortars", Case Studies in Construction Materials, vol. 9, Dec. 2018, pp. 1-15.

Azizul Islam, et al., "Development of geopolymer mortar using palm oil fuel ash-blast furnace slag-fly ash-as binders", Construction Materials and Structures, IOS Press Ebooks, 2018, pp. 475-480 (Abstract only).

Ali Mohamed Ali Aboshia, et al., "Enhancing mortar strengths by ternary geopolymer binder of metakaolin, slag, and palm ash", International Journal of Building Pathology and Adaptation, vol. 35, No. 5, 2017, pp. 438-455.

Ghasan Fahim Huseien, et al., "Synergism between palm oil fuel ash and slag: Production of environmental-friendly alkali activated mortars with enhanced properties", Construction and Building Materials, vol. 170, May 10, 2019, pp. 235-244 (Abstract only).

Babatunde Abiodun Salami, et al., "Impact of $Al(OH)_3$ addition of POFA on the compressive strength of POFA alkali-activated mortar", Construction and Building Materials, vol. 190, 2018, pp. 65-82.

* cited by examiner

*Primary Examiner* — Anthony J Green
(74) *Attorney, Agent, or Firm* — Oblon, McClelland, Maier & Neustadt, L.L.P.

(57) ABSTRACT

A mortar composition, which includes (i) a treated palm oil fuel ash, wherein the treated palm oil fuel ash is the only binder present, (ii) a fine aggregate, (iii) an alkali activator containing an aqueous solution of sodium hydroxide and sodium silicate, and (iv) aluminum hydroxide as a strength enhancer. A cured mortar made from the mortar composition is also disclosed with advantageous compressive strength properties.

6 Claims, 4 Drawing Sheets

Fig. 1

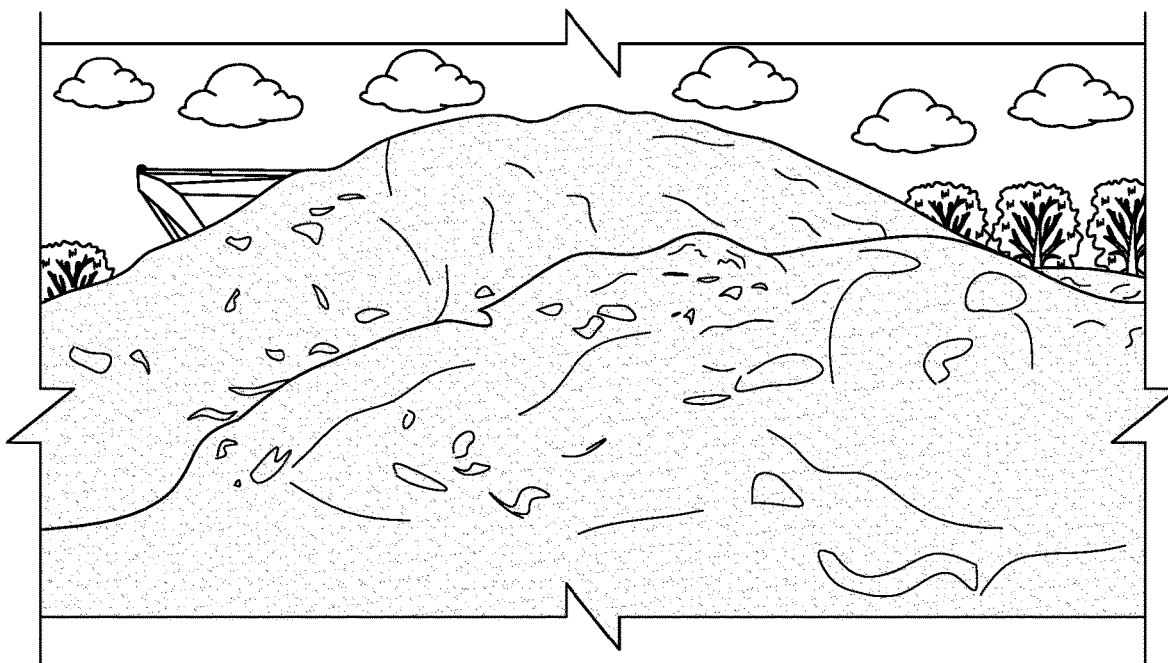

Fig. 2

| Treatment of palm oil fuel ash (POFA) |
|---|
| Collection of raw POFA from Nibong Tebal, Malaysia |
| Drying of POFA (e.g., at 105 °C for 24 h) to remove any inherent moisture |
| Sieving (e.g., through 300 μm sieve) to remove coarse and unwanted materials |
| POFA passing through e.g., 300 μm sieve ground in ball mill (e.g., for 6 h) |
| Heat treatment of ground POFA (e.g., at 550 °C for 2 h) to reduce carbon content and prevent glass crystallization |
| Re-grinding in ball mill (e.g., for 6 h) to form treated palm oil fuel ash (TPOFA) |
| Characterization of treated palm oil fuel ash (TPOFA) e.g., using XRD, XRF |
| Selection of TPOFA to produce POFA-engineered cementitious composite (POFA-EACC) |

MORTAR COMPOSITION CONTAINING IRON OXIDE

CROSS-REFERENCE TO RELATED APPLICATIONS

The present application is a Continuation of U.S. application Ser. No. 16/522,200, now U.S. Pat. No. 11,168,027, having a filing date of Jul. 25, 2019, the entire contents of which are incorporated herein by reference.

STATEMENT REGARDING PRIOR DISCLOSURES BY THE INVENTORS

Aspects of this technology are described in an article "Impact of Al(OH)$_3$ addition to POFA on the compressive strength of POFA alkali-activated mortar" by Babatunde Abiodun Salami, Megat Azmi Megat Johari, Zainal Arifin Ahmad, Mohammed Maslehuddin, and Adeshina Adewale Adewumi, in Construction and Building Materials, 2018, 190, pg. 65-82, which is incorporated herein by reference in its entirety.

BACKGROUND OF THE DISCLOSURE

Technical Field

The present disclosure relates to mortar compositions, specifically alkali-activated mortar compositions that include palm oil fuel ash, and cured mortar made therefrom.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

The cement industry has begun research into energy efficient cementitious materials to replace ordinary Portland cement (OPC). $CO_2$ is a byproduct produced during the production of Portland cement, specifically during the formation of clinker (intermediate product) using elevated temperatures inside a kiln, where calcium carbonate from calcium-rich material is converted into lime and $CO_2$. Therefore, in efforts to reduce or replace cement, and thus lower $CO_2$ emissions, the cement industry has turned to aluminosilicate binders using alkali-activated cement technologies, owing in part to the vast aluminosilicate material options.

Aluminosilicate materials are classified broadly into low and high calcium aluminosilicate materials based on the calcium oxide (CaO) content of these materials. The amount of CaO in these materials dictates the alkalinity level of the activator required for activation and the curing type necessary for the hardening process. With low calcium materials, such as metakaolin and other materials, a higher concentration of alkaline activators and thermal curing is often needed in order to enhance the reaction rate and ensure proper densification of the binder microstructure. However, when the calcium content is high, such as in fly ash, lower alkaline activator molarities and lower temperature curing can be used in the activation process to provide adequate hardening. Apart from CaO, alumina ($Al_2O_3$) is another constituent oxide involved in the alkali-activated binder strength-forming process. As a result, aluminosilicate materials having a low content of $Al_2O_3$ can greatly affect the microstructural properties of the binder, which by extension can affect the mechanical strength properties and durability performance of the alkali-activated binder. $Al_2O_3$ accelerates the setting of the alkali-activated binder while the setting of the alkali-activated binder is inhibited with increasing $SiO_2$ content. Palm oil fuel ash (POFA), for example, is characterized by high $SiO_2$ and low $Al_2O_3$ content, making it a non-obvious choice for use as a binder material.

POFA is an agricultural waste byproduct that has been historically dumped into fields indiscriminately, causing lost profits and health concerns to nearby inhabitants. Finding constructive and profitable uses for POFA thus remains of interest. However, the use of POFA as a binding material in cement/mortar has significant challenges. For instance, the chemical composition of POFA is characterized by a high amount of $SiO_2$ (in varying quantities depending on the region and treatment), and low quantities of $Al_2O_3$ and CaO, which greatly affects the engineering properties of POFA. This $Al_2O_3$ deficiency results in a slow rate of condensation reactions owing to the formation of more Si—O—Si bonds and fewer Si—O—Al bonds. In fact, two important parameters used by researchers to gauge effective binding materials are the $SiO_2/Al_2O_3$ ratio and the CaO content. The low alumina content in POFA is a huge hindrance for using POFA as a binder, as it causes inadequacies in $SiO_2$—$Al_2O_3$ bond formation needed for high strength.

In view of the forgoing, one object of the present disclosure is to provide mortar compositions that contain palm oil fuel ash (POFA), and cured mortars made therefrom with advantageous compressive strength and durability properties. Such mortar compositions may be made with POFA as the only binder material, which has the benefit of reducing POFA waste volumes in landfills, conserving natural materials, and reducing $CO_2$ emissions and energy consumption required for cement manufacture.

BRIEF SUMMARY OF THE DISCLOSURE

According to a first aspect, the present disclosure provides a mortar composition that includes (i) a treated palm oil fuel ash, wherein the treated palm oil fuel ash is the only binder present, (ii) a fine aggregate, (iii) an alkali activator containing an aqueous solution of sodium hydroxide and sodium silicate, and (iv) aluminum hydroxide.

In some embodiments, the treated palm oil fuel ash is present in an amount of 20 to 30 wt. %, based on a total weight of the mortar composition.

In some embodiments, the treated palm oil fuel ash is obtained sequentially from drying raw palm oil fuel ash at 80 to 120° C., sieving to a particle size of less than 300 μm, a first mechanical ball milling, calcining at 500 to 600° C., and a second mechanical ball milling.

In some embodiments, the treated palm oil fuel ash has a median particle size ($d_{50}$) of 0.5 to 2.0 μm.

In some embodiments, the treated palm oil fuel ash contains, as constituent oxides, 60 to 72 wt. % $SiO_2$, 4 to 8 wt. % $Al_2O_3$, 3 to 7 wt. % $Fe_2O_3$, 3 to 8 wt. % CaO, 1 to 5 wt. % MgO, 3 to 7 wt. % $K_2O$, 0.2 to 0.5 wt. % $SO_3$, 0.1 to 0.25 wt. % $Na_2O$, and 1 to 5 wt. % of $P_2O_3$, each based on a total weight of the treated palm oil fuel ash.

In some embodiments, the treated palm oil fuel ash contains, as constituent oxides, 66 to 68 wt. % $SiO_2$, 6 to 7 wt. % $Al_2O_3$, 5 to 6.5 wt. % $Fe_2O_3$, 5 to 6 wt. % CaO, 2.5 to 3.5 wt. % MgO, 4.5 to 6 wt. % $K_2O$, 0.3 to 0.35 wt. % $SO_3$, 0.18 to 0.2 wt. % $Na_2O$, and 3 to 4 wt. % of $P_2O_3$, each based on a total weight of the treated palm oil fuel ash.

In some embodiments, the treated palm oil fuel ash has a loss on ignition (LOI) of less 3 wt. %, based on a total weight of the treated palm oil fuel ash, and a specific surface area of 1.4 to 1.6 m²/g.

In some embodiments, a weight ratio of the fine aggregate to the treated palm oil fuel ash is 1:1 to 2:1.

In some embodiments, the fine aggregate has a fineness modulus of 1.8 to 2.1 and a saturated surface dry (SSD) specific gravity of 2.5 to 2.7.

In some embodiments, the fine aggregate is dune sand.

In some embodiments, a weight ratio of the alkali activator to the treated palm oil fuel ash is 0.3:1 to 0.7:1.

In some embodiments, a weight ratio of sodium silicate to sodium hydroxide is 1:1 to 3:1.

In some embodiments, the alkali activator is formed from an aqueous solution of sodium hydroxide having a sodium hydroxide concentration of 10 to 12 mol/L.

In some embodiments, a weight ratio of the aluminum hydroxide to the treated palm oil fuel ash is 0.01:1 to 0.05:1.

In some embodiments, the aluminum hydroxide is the only strength enhancer present.

In some embodiments, the mortar composition has weight ratio of water to the treated palm oil fuel ash of 0.2 to 0.98.

In some embodiments, mortar composition consists of the treated palm oil fuel ash, the fine aggregate, sodium hydroxide, sodium silicate, aluminum hydroxide, and water.

According to a second aspect, the present disclosure provides a cured mortar containing the mortar composition in cured form.

In some embodiments, the cured mortar has a 28 day compressive strength of 25 to 36 MPa.

In some embodiments, the cured mortar has a 28 day compressive strength of 30 to 35.6 MPa.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is an image of typical palm oil fuel ash (POFA) dumping site near to palm oil mill;

FIG. 2 is a flowchart for a treatment and production process for making treated POFA (TPOFA) used in the mortar composition;

DETAILED DESCRIPTION OF THE EMBODIMENTS

Figure 3:
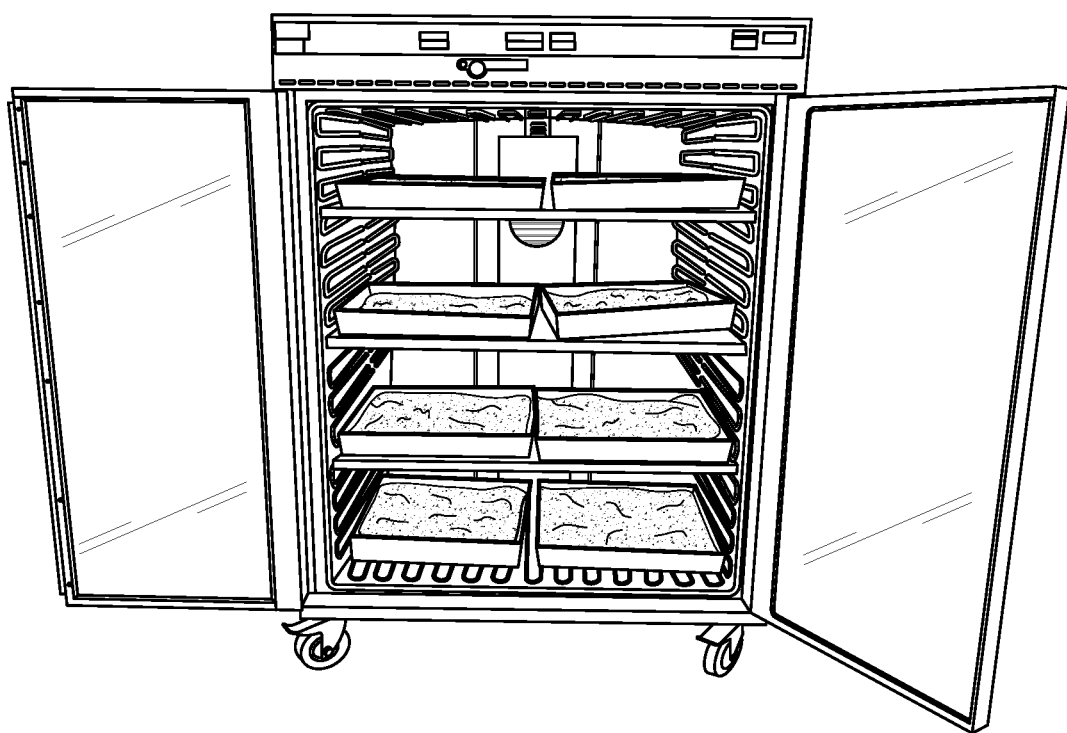
FIG. 3 is an image of raw POFA loaded into an oven for drying.

Embodiments of the present disclosure will now be described more fully hereinafter with reference to the accompanying drawings, in which some, but not all of the embodiments of the disclosure are shown.

Definitions

As used herein, the terms "optional" or "optionally" means that the subsequently described event(s) can or cannot occur or the subsequently described component(s) may or may not be present (e.g. 0 wt %).

The phrase "substantially free", unless otherwise specified, describes a particular component being present in an amount of less than about 1 wt. %, preferably less than about 0.5 wt. %, more preferably less than about 0.1 wt. %, even more preferably less than about 0.05 wt. %, yet even more preferably 0 wt. %, relative to a total weight of the composition being discussed.

The term "comprising" is considered an open-ended term synonymous with terms such as including, containing or having and is used herein to describe aspects of the invention which may (or may not) include additional components, functionality and/or structure. Terms such as "consisting essentially of" are used to identify aspects of the invention which exclude particular components that are not explicitly recited in the claim but would otherwise have a material effect on the basic and novel properties of the mortar composition in either a dry, wet or cured form. Basic and novel properties of the present disclosure include, but are not limited to, the strength such as compressive strength, curing time, slump, workable flow, and viscosity. The term "consisting of" describes aspects of the invention in which only those features explicitly recited are included and thus other components not explicitly or inherently included are excluded.

As used herein, the term "binder" refers to a composition or substance with one or more constituents that is capable of binding materials together, once set. While a "binder" classically refers to materials or mixtures of materials that are "cements" (e.g., Portland cement), in the present disclosure, a "binder" may be a cement or any other material that is capable of forming cement or capable of forming materials with cement-like binding properties. Therefore, included in the definition of "binder" are those materials that have little to no cementitious value by themselves but which will, in finely divided form and in the presence of water, react chemically with certain chemicals present in the mortar composition to form compounds possessing cementitious properties. For example, pozzolans and burned organic matter residues (e.g. fly ash, silica fume from silicon smelting, highly reactive metakaolin, palm oil fuel ash, date palm ash, etc.), while not considered "cements", are considered to be "binders" in the present disclosure.

As used herein, "mortar" refers to a thick mixture comprising water, fine aggregate, and binder, which is useful for holding building materials such as brick or stone together, for example. Mortar differs from concrete in that it does not include a coarse aggregate such as rock chippings, gravel, etc., and thus tends to be used as a glue element, and not as a structural element as is common with concrete.

Mortar Compositions

In an effort to reduce $CO_2$ emissions, the cement industry has turned to replacing cement binders such as ordinary Portland cement with low cost burned agricultural waste products possessing binding properties. However, even when used as a partial cement replacement, such burned agricultural waste products often provide inadequate strength properties (e.g., compressive strength) to the concrete or mortar, once cured. Such inadequacies are exacerbated when attempting to completely replace cement with burned agricultural waste products.

Thus, the present disclosure provides a mortar composition (specifically an alkali-activated mortar, AAM) in which the only binder present is a treated palm oil fuel ash, and which sets into a high compressive strength cured mortar. The mortar composition generally comprises, consists essentially of, or consists of a treated palm oil fuel ash as binder, a fine aggregate, an alkali activator of sodium hydroxide and sodium silicate, aluminum hydroxide, and water. The mortar composition may optionally contain one or more additives such as an accelerator, a retarder, a plasticizer (e.g., a superplasticizer), a pigment, a corrosion inhibitor, and a bonding agent.

Palm Oil Fuel Ash (POFA)

The oil palm is a tall-stemmed tree which belongs to the family Arecaceae (commonly known as palms). Oil palm trees, primarily the African oil palm *Elaeis guineensis*, and to a lesser extent the American oil palm *Elaeis* oleifera and the maripa palm *Attalea maripa*, are cultivated for their palm oil producing fruit. The countries in the equatorial belt that cultivate oil palm are Benin Republic, Colombia, Ecuador, Nigeria, Zaire, Malaysia, and Indonesia, of which Malaysia is the largest producer of palm oil and palm oil products (around 47-51% of the worlds exports of palm oil). In the palm oil industry, palm oil is extracted from the fruit and copra of the palm oil tree. After the extraction process, waste products such as palm oil fibers, shells, and empty fruit brunches are burned as biomass boiler fuel at 800 to 1,000° C. to boil water, which generates steam to power a turbine for supplying electrical energy to the entire palm oil mill extraction process. Usually, the palm oil waste product burned in the boiler is made up of about 85% palm oil fibers and about 15% shells and empty fruit bunches, although these percentages may vary. The resulting ashy, combustion byproduct is palm oil fuel ash (POFA), which constitutes about 5 wt. % of solid waste products formed during palm oil processing. POFA does not have sufficient nutrient value to be used as fertilizer and has traditionally been disposed in open fields (profitless).

The inventors have found that palm oil fuel ash, specifically palm oil fuel ash which is treated in a certain way, can be used as a full replacement binder for cement in mortar compositions without adversely affecting the compressive strength of the cured mortar, when used in combination with an alkali activator and an aluminum hydroxide strength enhancer.

'Raw' palm oil fuel ash, that is, palm oil fuel ash as it is formed/received from the oil palm boiler, typically has too high a carbon content (caused by incomplete burning of the residue) for use as an acceptable binder. Raw POFA typically also has a high moisture content of from 3 to 19 wt. %, or 4 to 15 wt. %, or 5 to 10 wt. % water, based on a total weight of the POFA, and a relatively large particle size, for example a median particle size ($d_{50}$) of 55 to 75 μm, preferably 60 to 70 μm, preferably 64 to 66 μm.

In preferred embodiments, the palm oil fuel ash utilized herein is treated palm oil fuel ash, which is palm oil fuel ash which has been subjected to a combination of drying, sieving, ball milling, and calcining. Briefly, treated palm oil fuel ash may be formed according to the following procedure.

The raw palm oil fuel ash obtained from a palm oil production facility (e.g., palm oil mill, United Oil Palm Industries Sdn. Bhd. in Nibong Tebal, Penang, Malaysia) may first be dried, for example, in an oven at 80 to 120° C., preferably 90 to 110° C., preferably 95 to 105° C., preferably about 100° C., to reduce the moisture content to below 5 wt. %, preferably below 4 wt. %, preferably below 3 wt. %, preferably below 2 wt. %, preferably below 1 wt. %. The raw palm oil fuel ash may be dried for any amount of time that provides an adequately dried product, typically, for drying times of 12 to 48 hours, preferably 16 to 36 hours, preferably 20 to 30 hours, preferably 24 hours.

The resulting dried palm oil fuel ash may then be subjected to sieving through one or more sieves of different size, preferably two or more sieves of different size, for example, sequentially through sieves of decreasing size to remove coarser and unwanted particulates. In preferred embodiments, the dried palm oil fuel ash is sieved sequentially through sieves of decreasing size, preferably through a set of two sieves of decreasing size, to provide sieved POFA having a particle size of less than 400 μm, preferably less than 350 μm, preferably less than 300 μm. For example, the dried POFA may be sieved sequentially through a set of 600 μm and 300 μm sieves, to provide sieved POFA containing no particles above 300 μm.

The resulting sieved palm oil fuel ash may then be subjected to a first mechanical ball milling procedure to reduce the particle size and/or to increase the surface area of the ash. Any type of ball milling apparatus known to ordinary skill in the art may be employed, including, but not limited to, a standard ball mill, a planetary mill, a vibration mill, an attritor—stirring ball mill, a pin mill, or a rolling mill. The vials and balls used for the ball milling may be individually selected from agate (cryptocrystalline silica), corundum ($Al_2O_3$), zirconium oxide ($ZrO_2$), stainless steel (Fe, Cr, Ni), tempered steel (Fe, Cr), and tungsten carbide (WC), preferably stainless steel (e.g., SS 316). In some embodiments, the balls employed in the ball milling operation have a size of from 6 to 32 mm, preferably 8 to 28 mm, preferably 10 to 24 mm, preferably 12 to 20 mm, preferably a variety of ball sizes are employed for the ball milling operation.

The following ball milling parameters may be utilized. The ball to powder ratio (BPR) or charge ratio represents the weight ratio of the milling balls to the POFA charge. Various BPRs may be employed, but typically a BPR may range from 1:1 to 10:1, preferably 2:1 to 9:1, preferably 3:1 to 8:1, preferably 4:1 to 7:1, preferably 5:1 to 6:1. The sieved palm oil fuel ash may be ball milled at a rotational speed of 100 to 600 rpm, preferably 120 to 500 rpm, preferably 140 to 400 rpm, preferably 160 to 300 rpm, preferably 180 to 200 rpm. The milling time may also influence the product morphology and particle size. Suitable milling times that may be practiced herein range from 15 minutes to 8 hours, preferably 30 minutes to 6 hours, preferably 1 to 5 hours, preferably 1.5 to 4.5 hours, preferably about 2 to 4 hours, although shorter or longer milling times may also be practiced. Further, the sieved palm oil fuel ash may be ball milled in various atmospheres, for example, in some embodiments, ball milling is performed in air (or a generally oxygen-containing atmosphere, e.g., which includes any atmosphere that contains at least 20%, preferably at least 40%, preferably at least 60%, preferably at least 80%, preferably at least 90%, preferably at least 95%, preferably at least 99%, or about 100% oxygen by volume). Alternatively, ball milling may be carried out under an inert atmosphere such as under nitrogen or argon, preferably argon. The resulting product may be referred to herein as ground palm oil fuel ash or "GPOFA". In general, the GPOFA has a median particle size ($d_{50}$) of 2.8 to 3.5 μm, preferably 2.9 to 3.1 μm, preferably 2.96 to 3.0 μm.

At this stage, GPOFA still contains a relatively high amount of unburned carbon, with a loss on ignition (LOI) of greater than 8 wt. %, or greater than 9 wt. %, or greater than 10 wt. %, and a correspondingly low amount of constituent oxides useful for delivering binding properties (see Table 1 for an example chemical constitution of GPOFA). To remove the unburned carbon content and to provide an ash material with improved pozzolanic properties, the GPOFA is preferably calcined. The calcination may be performed in a furnace, for example, a gas-powered furnace. The calcination may be performed using a pre-set temperature program or using other variable temperature systems known by those of ordinary skill in the art. The GPOFA may be calcined under isothermal conditions or under variable temperature conditions, typically at a temperature range of 400 to 900° C., preferably 425 to 850° C., preferably 450 to 800° C., more preferably 475 to 750° C., preferably 500 to 700° C., preferably 550 to 600° C. The calcination is typically performed for 20 minutes to 8 hours, preferably 40 minutes to 6 hours, preferably 60 minutes to 4 hours, preferably 80 minutes to 3 hours, preferably 90 minutes to 2 hours, although shorter or longer calcination times may also be used herein.

While the calcined palm oil fuel ash may possess adequate binding capabilities when employed as a partial cement replacement, or in a blend (binary, ternary, etc.) with other binding materials (e.g., fly ash, ground blast furnace slag, silica fume, metakaolin, etc.), it has been discovered that subjecting the calcined palm oil fuel ash to a second mechanical ball milling procedure provides a palm oil fuel ash product with the highest performance (referred to herein as treated palm oil fuel ash or "TPOFA"), which enables its use as a full cement replacement, and without the need for additional binders. The parameters of the second ball milling procedure are as described for the first ball milling procedure above. The parameters used (the type of equipment, the materials used for the vials, the materials used for the balls, the ball size, the BPR, the rotational speed, the milling time, the milling atmosphere) for the first ball milling and the second ball milling may be the same, or different, preferably the parameters used for the first and second ball milling operations are the same.

Treated palm oil fuel ash (TPOFA) may vary in terms of the percent of constituent oxides present depending on a number of factors, such as the type of oil palm tree cultivated, the source/location of the oil palm tree cultivated, the relative proportion of the waste products (palm oil fibers, shells, and empty fruit brunches) combusted to produce the POFA, the combustion conditions, as well as the post-combustion processing, etc. The treated palm oil fuel ash used herein generally comprises, consists of, or consists essentially of, $SiO_2$, $Al_2O_3$, $Fe_2O_3$, CaO, MgO, $K_2O$, $SO_3$, $Na_2O$, and $P_2O_3$. In preferred embodiments, the treated palm oil fuel ash utilized in the present disclosure has a total content of $SiO_2$, $Al_2O_3$, and $Fe_2O_3$ that complies with ASTM C618 class F standards for pozzolan, which is incorporated herein by reference in its entirety. The present disclosure contemplates using a wide variety of treated palm oil fuel ash materials, with the following constitutional makeup being preferred.

In some embodiments, the treated palm oil fuel ash has a weight percentage of $SiO_2$ of 60 to 72 wt. %, preferably 61 to 71 wt. %, preferably 62 to 70 wt. %, preferably 63 to 69 wt. %, preferably 64 to 68 wt. %, preferably 65 to 67.5 wt. %, preferably 66 to 67 wt. %, based on a total weight of the treated palm oil fuel ash.

In some embodiments, the treated palm oil fuel ash has a weight percentage of $Al_2O_3$ of 4 to 8 wt. %, preferably 4.5 to 7.5 wt. %, preferably 5 to 7 wt. %, preferably 5.5 to 6.8 wt. %, preferably 6 to 6.5 wt. %, based on a total weight of the treated palm oil fuel ash.

In some embodiments, the treated palm oil fuel ash has a weight percentage of $Fe_2O_3$ of 3 to 7 wt. %, preferably 3.5 to 6.5 wt. %, preferably 4 to 6.3 wt. %, preferably 4.5 to 6.1 wt. %, preferably 5 to 6 wt. %, preferably 5.5 to 5.8 wt. %, based on a total weight of the treated palm oil fuel ash.

In some embodiments, the treated palm oil fuel ash has a weight percentage of CaO of 3 to 8 wt. %, 3.5 to 7 wt. %, preferably 4 to 6.5 wt. %, preferably 4.5 to 6.3 wt. %, preferably 5 to 6.1 wt. %, preferably 5.3 to 6 wt. %, preferably 5.5 to 5.8 wt. %, based on a total weight of the treated palm oil fuel ash.

In some embodiments, the treated palm oil fuel ash has a weight percentage of MgO of 1 to 5 wt. %, preferably 1.5 to 4.5 wt. %, preferably 2 to 4 wt. %, preferably 2.5 to 3.8 wt. %, preferably 3 to 3.5 wt. %, preferably 3.1 to 3.2 wt. %, based on a total weight of the treated palm oil fuel ash.

In some embodiments, the treated palm oil fuel ash has a weight percentage of $K_2O$ of 3 to 7 wt. %, preferably 3.5 to 6.5 wt. %, preferably 4 to 6 wt. %, preferably 4.5 to 5.8 wt. %, preferably 5 to 5.4 wt. %, preferably 5.1 to 5.3 wt. %, based on a total weight of the treated palm oil fuel ash.

In some embodiments, the treated palm oil fuel ash has a weight percentage of $SO_3$ of 0.2 to 0.5 wt. %, preferably 0.25 to 0.45 wt. %, preferably 0.3 to 0.4 wt. %, preferably 0.31 to 0.38 wt. %, preferably 0.32 to 0.34 wt. %, based on a total weight of the treated palm oil fuel ash.

In some embodiments, the treated palm oil fuel ash has a weight percentage of $Na_2O$ of 0.1 to 0.25 wt. %, preferably 0.13 to 0.23 wt. %, preferably 0.15 to 0.22 wt. %, preferably 0.17 to 0.21 wt. %, preferably 0.18 to 0.2 wt. %, based on a total weight of the treated palm oil fuel ash.

In some embodiments, the treated palm oil fuel ash has a weight percentage of $P_2O_3$ of 1 to 5 wt. %, preferably 2 to 4 wt. %, preferably 3 to 3.8 wt. %, preferably 3.2 to 3.6 wt. %, preferably 3.3 to 3.5 wt. %, based on a total weight of the treated palm oil fuel ash.

In some embodiments, the treated palm oil fuel ash of the present disclosure has a loss on ignition (LOI) of less than 4 wt. %, preferably less than 3 wt. %, preferably less than 2.5 wt. %, preferably less than 2.4 wt. %, preferably less than or equal to 2.3 wt. %, based on a total weight of the treated palm oil fuel ash.

In preferred embodiments, the treated palm oil fuel ash comprises, as constituent oxides, 66 to 68 wt. % $SiO_2$, 6 to 7 wt. % $Al_2O_3$, 5 to 6.5 wt. % $Fe_2O_3$, 5 to 6 wt. % CaO, 2.5 to 3.5 wt. % MgO, 4.5 to 6 wt. % $K_2O$, 0.3 to 0.35 wt. % $SO_3$, 0.18 to 0.2 wt. % $Na_2O$, and 3 to 4 wt. % of $P_2O_3$, each based on a total weight of the treated palm oil fuel ash.

In some embodiments, the treated palm oil fuel ash has a median particle size ($d_{50}$) of 0.5 to 2.0 μm, preferably 0.6 to 1.8 μm, preferably 0.7 to 1.6 μm, preferably 0.8 to 1.4 μm, preferably 0.9 to 1.2 μm, preferably 1.0 to 1.1 μm, preferably 1.068 μm.

In some embodiments, the treated palm oil fuel ash has a specific surface area of 1.4 to 1.6 m$^2$/g, preferably 1.45 to 1.58 m$^2$/g, preferably 1.5 to 1.56 m$^2$/g, preferably 1.51 to 1.54 m$^2$/g, preferably 1.52 to 1.53 m$^2$/g.

The treated palm oil fuel ash may be used as a partial replacement of cement, or may be used in combination with one or more other binders (discussed below) in a binder blend. Therefore, in such circumstances, the treated palm oil fuel ash may be employed in an amount of up to 30 wt. %, preferably up to 25 wt. %, preferably up to 20 wt. %, preferably up to 15 wt. %, preferably up to 10 wt. %, preferably up to 5 wt. %, preferably up to 1 wt. %, preferably up to 0.5 wt. %, based on a total weight of the mortar composition. However, the treated palm oil fuel ash may be advantageously employed as a complete cement replacement, and wherein the TPOFA is the only binder present. Thus, in preferred embodiments, the treated palm oil fuel ash is the only binder present, and is employed an amount of 20 to 30 wt. %, preferably 21 to 29 wt. %, preferably 22 to 28 wt. %, preferably 23 to 27 wt. %, preferably 24 to 26 wt. %, preferably 25 wt. %, based on a total weight of the mortar composition.

In the present disclosure, other binders which may be optionally included in the mortar composition, but which are preferably excluded from the mortar composition, include any cement and/or pozzolan/burned organic matter residues (other than TPOFA) capable of producing cement-like binding properties.

Exemplary cements may be any hydraulic cement or a non-hydraulic cement, for example, Ordinary Portland Cement (OPC) type I, type II, type III, type IV, type V, type Ia, type IIa, type Ma or a combination thereof (in accordance with the ASTM CI50 standard); Portland fly ash cement; Portland Pozzolan cement; Portland silica fume cement; masonry cements; EMC cements; stuccos; plastic cements; expansive cements; white blended cements; Pozzolan-lime cements; slag cements; slag-lime cements; supersulfated cements; calcium aluminate cements; calcium sulfoaluminate cements; geopolymer cements; Rosendale cements; polymer cement mortar; lime mortar; Pozzolana mortar; and the like, as well as mixtures thereof.

Exemplary pozzolanic and/or burned organic matter residues may include, but are not limited to, limestone; fly ash (e.g. siliceous fly ash and/or calcareous fly ash), for example Class C fly ash, Class F fly ash, pulverized fly ash, ultrafine Class F fly ash; slag; ground blast furnace slag (GGBFS or GGBS); cement kiln dust (CKD); silica fume or other fine forms of silica such as fine silica flour; metakaolin; vitreous calcium aluminosilicate (VCAS); carbon nanofibers and other carbon products; calcium hydroxide ($Ca(OH)_2$); date palm ash or simply "palm ash", which is produced as wastage during the production of palm firewood and coal products (typically has a chemical constitution of 30-40 wt % $SiO_2$, 0.1-1.0 wt % of $Fe_2O_3$, 10-15 wt % of CaO, 0.1-1.0 wt % of $Al_2O_3$, 5-10 wt % of MgO, 2-10 wt % of $K_2O$, and 1-5 wt % of $Na_2O$); burned palm oil products (other than palm oil fuel ash) such as oil palm shell (OPS); rice husk ash; volcanic ashes and pumices (e.g., crushed volcanic glass); diatomaceous earth; synthetic pozzolans such as synthesized reactive aluminosilicate glasses; zeolite materials such as calcined zeolites; cenospheres; pozzolana; calcined shale; trass; pumice; siliceous clays; metropolitan waste ash; sewerage ash; coal wash tailings; mineral tailings; scoria; obsidian; other flue ashes; and other ash derived from burning organic waste.

Fine Aggregate

The mortar composition of the present disclosure may also include one or more fine aggregates. The fine aggregate may include, but is not limited to, sand (e.g., dune sand), crushed stone, crushed rock, crushed shells, or other crushed/pulverized/ground material, for example, crushed/pulverized/ground forms of concrete, gravel, rocks, natural soil, quarried crushed mineral aggregates from igneous (granite, syenite, diorite, gabbro peridotite pegmatite, volcanic glass, felsite, basalt), metamorphic (marble, metaquartzite, slate, phyllite, schist, amphibolite, hornfels, gneiss, serpentite) or sedimentary rocks (conglomerate, sandstone, claystone, siltstone, argillite, shale, limestone, dolomite, marl, chalk, chert), including unused and waste aggregates from quarry operations, dredged aggregates, china clay stent, china clay wastes, natural stone, recycled bituminous pavements, recycled concrete pavements, reclaimed road base and subbase materials, crushed bricks, construction and demolition wastes, crushed glass, slate waste, waste plastics, egg shells, sea shells, barite, limonite, magnetite, ilmenite, hematite, iron, steel, including recycled or scrap steel, and mixtures thereof. In preferred embodiments, the fine aggregate employed in the mortar compositions is dune sand.

The amount of fine aggregate deployed herein may vary, but typically a weight ratio of the fine aggregate to the treated palm oil fuel ash ranges from 1:1 to 2:1, preferably 1.1:1 to 1.9:1, preferably 1.2:1 to 1.8:1, preferably 1.3:1 to 1.7:1, preferably 1.4:1 to 1.6:1, preferably 1.5:1.

The fine aggregate may have an average particle size of 0.3 to 1 mm, preferably 0.4 to 0.8 mm, preferably 0.5 to 0.6 mm, although fine aggregates with average particle sizes slightly above or below these values may also function as intended. The grading of fine aggregate employed herein preferably conforms to the standard ASTM C 33/C33M-18, which is incorporated herein by reference in its entirety.

In preferred embodiments, the fine aggregate has a fineness modulus of 1.8 to 2.1, preferably 1.81 to 2.0, preferably 1.82 to 1.9, preferably 1.83 to 1.88, preferably 1.84 to 1.86, preferably 1.85. The Fineness modulus (FM) is an empirically determined index of the fineness of an aggregate—the higher the FM, the coarser the aggregate. The fineness modulus is obtained by adding the cumulative percentages by mass retained on each of a specified series of sieves and dividing the sum by 100. The specified sieves for determining the fineness modulus for fine aggregate are 0.15 mm, 0.3 mm, 0.6 mm, 1.18 mm, 2.36 mm, 4.75 mm, and 9.5 mm, for example, according to ASTM C125 and ASTM C33/C33M-18.

In preferred embodiments, the fine aggregate has a saturated surface dry (SSD) specific gravity of 2.5 to 2.7, preferably 2.55 to 2.68, preferably 2.6 to 2.66, preferably 2.61 to 2.64, preferably 2.62. Saturated surface dry (SSD) is defined as the condition of an aggregate in which the surfaces of the particles are "dry" (i.e., surface adsorption would no longer take place), but the inter-particle voids are saturated with water. In this condition aggregates will not affect the free water content of a composite material. That is, SSD specific gravity is the ratio of the weight in air of a unit volume of aggregate, including the weight of water within the voids filled to the extent achieved by submerging in water for approximately 15 hours, and where the excess, free surface moisture has been removed so that the surface of the particle is essentially dry, to the weight in air of an equal volume of gas-free distilled water at the stated temperature, for example, according to AASHTO T 84.

While in some cases the mortar composition can be formulated to include a coarse aggregate, in preferred embodiments, the mortar composition is substantially free of coarse aggregates.

Alkali Activator

An alkali activator must be included in the mortar composition. Alkali activation generally releases reactive species (e.g., CaO) from the binder, thus increasing the rate of densification and improving the microstructural strength of the binder, which by extension affects the mechanical properties and durability performance of the cured mortar. The alkali activator may be a mixture of an aqueous solution of a metal hydroxide, preferably an alkali metal hydroxide (e.g., sodium hydroxide, potassium hydroxide, etc.), and a metal silicate, preferably an alkali metal silicate (e.g., sodium silicate, potassium silicate, etc.). In some embodiments, the alkali activator may be an aqueous solution of a metal hydroxide, preferably an alkali metal hydroxide.

In preferred embodiments, the alkali activator is an aqueous mixture of sodium hydroxide and sodium silicate. Preferably, the alkali activator consists of sodium hydroxide and sodium silicate in water. A weight ratio of sodium silicate to sodium hydroxide may generally range from 1:1 to 3:1, preferably 1.2:1 to 2.9:1, preferably 1.4:1 to 2.8:1, preferably 1.6:1 to 2.7:1, preferably 1.8:1 to 2.6:1, preferably 2:1 to 2.5:1. In some embodiments, the sodium silicate has a silica modulus ($SiO_2$:$Na_2O$ weight ratio) of 1.5 to 4, preferably 2 to 3.8, preferably 2.5 to 3.6, preferably 3 to 3.4, preferably 3.3. In some embodiments, the sodium hydroxide has a specific gravity of 2 to 2.4, preferably 2.05 to 2.3, preferably 2.1 to 2.2, preferably 2.13.

In preferred embodiments, the mortar compositions are prepared using a weight ratio of the alkali activator to the treated palm oil fuel ash of from 0.3:1 to 0.7:1, preferably 0.34:1 to 0.65:1, preferably 0.36:1 to 0.6:1, preferably 0.38:1 to 0.55:1, preferably 0.4:1 to 0.5:1.

The way in which the alkali activator is prepared may also impact the final properties of the cured mortar. For example, the concentration of the sodium hydroxide used to prepare the alkali activator has been found to impact the compressive strength of the cured mortar. Typically, the sodium hydroxide and sodium silicate are premixed in the form of an aqueous solution, and this aqueous alkali activator solution is then added to any dry components to form the mortar composition, as will be discussed hereinafter. In this process, it has been found that use of an aqueous solution of sodium hydroxide having a concentration of 8 to 12 mol/L, preferably 9 to 11 mol/L, preferably 10 mol/L, ultimately provides cured mortars with superior compressive strength properties. Without being bound by theory, it is believed that such molar concentrations of sodium hydroxide combines with the sodium silicate in such a way that effects the rate of silica and alumina release from the palm oil fuel ash material, and the enhanced dissolution produces cured mortar with superior strength characteristics (e.g., compressive strength).

Strength Enhancer

The mortar composition of the present disclosure may also include a strength enhancer, preferably an aluminum-containing strength enhancer. In preferred embodiments, the strength enhancer is aluminum hydroxide ($Al(OH)_3$). Any amount of aluminum hydroxide may be employed herein that provides acceptable $Al_2O_3$ levels in the mortar compositions and, ultimately, strength properties to the cured mortar. In some embodiments, a weight ratio of the aluminum hydroxide to the treated palm oil fuel ash is 0.01:1 to 0.05:1, preferably 0.015:1 to 0.04:1, preferably 0.016:1 to 0.03:1, preferably 0.018:1 to 0.025:1, preferably 0.02:1.

The mortar compositions may optionally include other strength enhancers besides aluminum hydroxide, and such other strength enhancers are generally known to those of ordinary skill in the art, for example, sodium fluoride, potassium fluoride, sodium sulfate, sodium oxalate, an alkali phosphate (e.g., sodium phosphate) and related compounds, just to name a few. However, in preferred embodiments, the mortar composition is substantially free of all other strength enhancers other than aluminum hydroxide, i.e., aluminum hydroxide is the only strength enhancer present.

Water

The mortar composition also includes water. In some embodiments, the weight ratio of the water to the treated palm oil fuel ash is 0.2 to 0.98, preferably 0.3 to 0.9, preferably 0.4 to 0.8, preferably 0.5 to 0.7, preferably 0.55 to 0.6. It is normally advantageous in mortar compositions to utilize an amount of water that provides a thick mixture for easy application as a glue-like material for building materials such as brick. However, a person of ordinary skill can adjust the water content of the mortar compositions as needed to suit the application or workability requirements, and the water to binder (POFA) weight ratio may therefore fall outside of these described ranges. Suitable water sources include fresh water, potable water, and the like, preferably potable water.

Additives

In some embodiments, the mortar compositions optionally include one or more additives such as an accelerator, a retarder, a plasticizer (e.g., a superplasticizer), a pigment, a corrosion inhibitor, and a bonding agent, including mixtures thereof. The additional additive(s), when present, may be present in an amount up to 5 wt. %, preferably up to 4 wt. %, preferably up to 3 wt. %, preferably up to 2 wt. %, preferably up to 1 wt. %, preferably up to 0.5 wt. %, preferably up to 0.1 wt. %, preferably up to 0.05 wt. %, preferably up to 0.01 wt. %, based on the total weight of the mortar composition.

An accelerator is any chemical capable of accelerating the hardening (early strength development) of mortar. Suitable examples of accelerators that may be included in the mortar compositions herein include, but are not limited to, calcium nitrite, calcium nitrate, calcium formate, calcium chloride, sodium nitrate, or a combination thereof.

A retarder is any chemical capable of retarding the hardening (early strength development) of mortar. Acceptable examples of retarders include, but are not limited to, a borate salt such as of sodium pentaborate ($Na_2B_{10}O_{16}$), sodium tetraborate ($Na_2B_4O_7$) and boric acid ($H_3BO_3$); an organophosphonate such as sodium or calcium salts of ethylenediaminetetra (methylenephosphonic acid) (EDTMP), hexamethylenediaminetetra (methylenephosphonic acid), and diethylenetriaminepenta (methylenephosphonic acid); acrylamide copolymers such as copolymers formed from 2-acrylamido-2-methylpropane-3-sulphonic acid (AMPS) and one or more acrylic acid or non-sulfonated acrylamide monomers; metal sulfates such as ferrous sulfate; gypsum; sugar; sucrose; sodium gluconate; glucose; citric acid; tartaric acid; and the like; as well as mixtures thereof.

Broadly, a plasticizer is a material that when added to another yields a mixture which is easier to handle or has greater utility. The plasticizer as used herein means an organic compound which is usually non-volatile at standard room temperature and pressure (25° C., 1 atm.) and which has no specific chemical reactivity. As such, the plasticizer is generally inert towards the binder and merely serves as a medium in which that binder may be suspended or otherwise dispersed. Suitable plasticizers may include, but are not limited to, polyalkyleneglycols and other polyethers such as polyethylene glycol, polypropylene glycol, and polybutyleneglycol, including blends of two or more of such polyalkyleneglycols or blends of one or more of such polyalkyleneglycols with one or more co-plasticizers, as well as phosphonic acid terminated polyalkylene glycols; sulfonated or phosphorylated organic compounds such as alkyl sulfonic acid esters of phenol and cresol (for example MESAMOLL from Lanxess) and aromatic sulfonamides; alkyl or aryl esters of organic acids such as benzoic acid esters of glycols and their oligomers, esters of 1,2-dicarboxycyclohexane (hydrogenated phthalates), phthalic acid esters, terephthalic acid esters, trimellitates, adipic acid esters, sebasic acid esters, tartrate esters, citric acid esters and sucrose esters; oils which can be natural or synthetic, such as vegetable oils and their derivatives including fatty acid esters and epoxidized vegetable oils, organic liquids derived from wood and other forest products like liquid rosin esters, hydrocarbon fluids such as mineral oil or paraffinic liquids, and silicones; vinyl polymers such as polyisobutene, liquid polybutadiene, and polycarboxylates such as polycarboxylate (polycarboxylic) ethers (PCE) made from polymers of acrylic acid and/or maleic acid with ether side chains, for example ETHACRYL products from Arkema or MASTERGLENIUM products from BASF; polyesters; formaldehyde (formalin) resins (condensates) such as sulfonated naphthalene formaldehyde resin, sulfonated melamine formaldehyde resin, acetone formaldehyde resin, e.g., crosslinked PMS (polymelamine sulfonate) and crosslinked PNS (polynaphthalene sulfonate); and mixtures thereof.

One particular type of plasticizer known as superplasticizer (SP) may be optionally employed in the disclosed mortar compositions. Superplasticizers are also known as high range water reducers, and are additives generally used in making high strength mortar or concrete. In preferred embodiments, when present, the superplasticizer satisfies the ASTM C494/C494M-17 requirements, which is incorporated herein by reference in its entirety. The superplasticizers that may be employed in the present disclosure include, but are not limited to, polyalkylaryl sulfonate superplasticizers, such as condensation products of naphthalene sulfonic acid with formalin or a salt thereof, a condensation product of methylnaphthalene sulfonic acid with formalin or a salt thereof, and a condensation product of anthracene sulfonic acid with formalin or a salt thereof, for example, MIGHTY 100, MIGHTY 150, and MIGHTY 200 each available from KAO Corporation, and PANTARHIT FT-500 available from Ha-Be Betonchemie; melamine/formalin resin sulfonate superplasticizers, for example MELMENT F-10 available from BASF; sulfonated copolymer superplasticizers such as styrene-$\alpha$-methylstyrene copolymers containing a mole ratio of from 90:10 to 10:90, preferably 30:70 to 70:30, of styrene to $\alpha$-methylstyrene; polycarboxylates, in particular polycarboxylate ethers (PCE) such as those made from copolymerization of (meth) acrylic acids, maleic anhydride, maleic acids or their salts, with polyoxyethylene (meth)acrylic esters or adducts of polyethylene derivatives to vinyl monomers, for example MELFLUX or MASTERGLENIUM products available from BASF; or any other plasticizers exhibiting strong tackiness and non-bleeding properties; including mixtures thereof. In some embodiments, when present, the superplasticizer is a chloride-free superplasticizer. In preferred embodiments, when present, the superplasticizer is a sulfonated naphthalene formalin resin.

Pigments may be optionally included in the mortar composition to form colored cured mortars. Exemplary pigments include, but are not limited to, iron oxide, natural burnt umber, carbon black, chromium oxide, ultra-marine blue, titanium dioxide, among many other pigments known to those of ordinary skill in the art to provide mortars with desirable colors.

The mortar compositions may optionally be formulated with corrosion inhibitors. Any corrosion inhibitor known to those of ordinary skill in the art for use in mortar/concrete applications may be used herein, with specific mention being made to nitrites (e.g. calcium nitrite), chromates, phosphates, benzotriazoles, alkanolamines (e.g. N,N-diethyl-ethanolamine, N-methyl-ethanolamine, monoethanloamine, diethanloamine, triethanloamine), including mixtures thereof.

Bonding agents may also be optionally included in the mortar compositions. Exemplary bonding agents include, but are not limited to, aluminum sulfate, latex resins such as acrylic polymer latex resins, epoxy resins, vinyl polymer resins.

In some embodiments, the mortar composition is substantially free of additives. In some embodiments, the mortar composition is substantially free of plasticizers, in particular, superplasticizers. In some embodiments, the mortar composition is substantially free of organosilicon compounds. In some embodiments, the mortar compositions are substantially free of synthetic polymers such as polyvinyl alcohol (PVA), including PVA fibers, either coated or uncoated. In some embodiments, the mortar composition is substantially free of foaming agents. In some embodiments, the mortar composition is substantially free of defoamers. In preferred embodiments, the mortar composition consists of the treated palm oil fuel ash, the fine aggregate, sodium hydroxide, sodium silicate, aluminum hydroxide, and water.

In some embodiments, the mortar composition has a workable flow, expressed as a percentage increase in the average base diameter of a 50 mm cube mortar specimen after performing table drops compared to the original base diameter, of 105 to 140%, preferably 110 to 135%, preferably 115 to 130%, preferably 120 to 125%, per ASTM C1437, which is incorporated herein by reference in its entirety.

Any method known by those of ordinary skill in the art may be used to make the mortar composition of the present disclosure. One exemplary method will now be briefly described.

The mortar compositions of the present disclosure may be prepared by first dry-mixing the binder (e.g. treated palm oil fuel ash), the fine aggregate, the strength enhancer (e.g., aluminum hydroxide), and any solid optional additives either by hand or using a mechanical mixer such as a Hobart floor mixer for any time period suitable for removing air pockets and forming a uniform mixture of dry materials (dry mix). Typical mixing times may be around 0.5 to 10 minutes, preferably 1 to 5 minutes, preferably 2 to 3 minutes. In some embodiments, such a dry mix may obtained as a pre-formed and/or pre-packaged dry mix.

Next, the alkali activator (e.g., an aqueous mixture of sodium hydroxide and sodium silicate) may be added and the mixture may be mixed for 1 to 10 minutes, preferably 3 to 8 minutes, preferably 5 to 6 minutes, although time periods outside of these ranges may also be acceptable.

In some embodiments, all of the water used to make the mortar composition comes from the addition of the alkali activator. Alternatively, in some instances it may be desirable to add additional water and/or any optional additive(s) after alkali activation to improve the consistency/workable flow of the mortar composition or to otherwise change the properties of the mortar composition/cured mortar. When additional water and/or optional additive(s) are added, the mixture may be preferably mixed for an additional 1 to 10 minutes, preferably 3 to 8 minutes, preferably 4 to 5 minutes, or otherwise to provide an overall average mixing time of 8 to 16 minutes, preferably 10 to 14 minutes, preferably 12 minutes. Intermittently, the mixing operation may be stopped to remove any clumps of solid materials that stick to the bottom of the mixing vessel, and then mixing may be again continued until a desirable homogeneity and consistency of the mortar composition has been achieved.

Of course, the relative amounts of the components may be adjusted at any point to achieve mortar compositions having the desired properties. For example the workable flow may be tested according to ASTM C1437 and the relative amounts of any component(s) (e.g., water, fine aggregate, binder, strength enhancer, and/or any optional additive(s)) may be adjusted as needed to be within desired specifications.

Cured Mortar

After forming the mortar composition, the mortar composition may be molded, casted, placed, applied, compacted, and/or finished, and then cured (set) as needed to suit a particular application. For example, the mortar composition may be placed in between construction materials and cured, applied to a surface such as a brick wall and cured to smoothen said wall, etc.

Curing may be carried out under ambient conditions, for example 20 to 35° C., preferably 23 to 30° C., preferably 25 to 28° C., or through applied heat, for example at temperatures of 50 to 70° C., preferably 55 to 65° C., preferably 60° C. The cure times may vary from 1 day to 180 days, for example, 3, 7, 14, 28, 90, 180 days and any time in between those stated values, preferably 7 to 28 days.

In some embodiments, the cured mortar has a unit weight of 2200 to 2300 kg/m$^3$, preferably 2210 to 2290 kg/m$^3$, preferably 2220 to 2280 kg/m$^3$, preferably 2230 to 2270 kg/m$^3$, preferably 2240 to 2260 kg/m$^3$, preferably 2250 kg/m$^3$.

The mortar composition described herein provides cured mortar with exceptionally high compressive strength considering that cement is preferably fully replaced with a waste product (i.e., treated palm oil fuel ash). The mortar composition provides, after curing/setting, a cured mortar with 28-day compressive strength of 25 to 36 MPa, preferably 25.5 to 35.9 MPa, preferably 26 to 35.8 MPa, preferably 26.5 to 35.7 MPa, preferably 27 to 35.6 MPa, preferably 27.5 to 35.5 MPa, preferably 28 to 35.4 MPa, preferably 28.5 to 35.3 MPa, preferably 29 to 35.2 MPa, preferably 29.5 to 35.1 MPa, preferably 30 to 35 MPa. All compressive strength tests may be tested using 50 mm cubed mortar samples according to ASTM C39, which is incorporated herein by reference in its entirety.

The disclosed mortar compositions may be useful in many structural and infrastructural applications that utilize concrete, brick, or other structural element as building material, and in the manufacture of various end use articles or products. For example, the cured mortar may be applied to or otherwise used to form, slabs, panels, precast panels, wall boards, floor and roof tiles, catch basins, manholes, beams, columns, posts, conduits and pipes, insulators, external cladding, slate, concrete decking, e.g. swimming pools, surfaces and surrounds, ceramic style products, marble like products, sink tops, bar tops, bathroom tops, table tops, fireplace tiles, fire proof walls, building blocks (e.g. masonry blocks); both reinforced and not reinforced by steel, depending on the use and purpose for which the manufactured products are fabricated. In preferred embodiments, the cured mortar described herein possess sufficient mechanical properties for use in applications described in ASTM C139, which is incorporated herein by reference in its entirety.

Having generally described this disclosure, a further understanding can be obtained by reference to certain specific examples which are provided herein for purposes of illustration only and are not intended to be limiting unless otherwise specified.

Where a numerical limit or range is stated herein, the endpoints are included. Also, all values and subranges within a numerical limit or range are specifically included as if explicitly written out.

The present disclosure also contemplates other embodiments "comprising", "consisting of" and "consisting essentially of", the embodiments or elements presented herein, whether explicitly set forth or not.

As used herein, the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

EXAMPLES

Materials and Methods
Palm Oil Fuel Ash (POFA)

Figure 4:
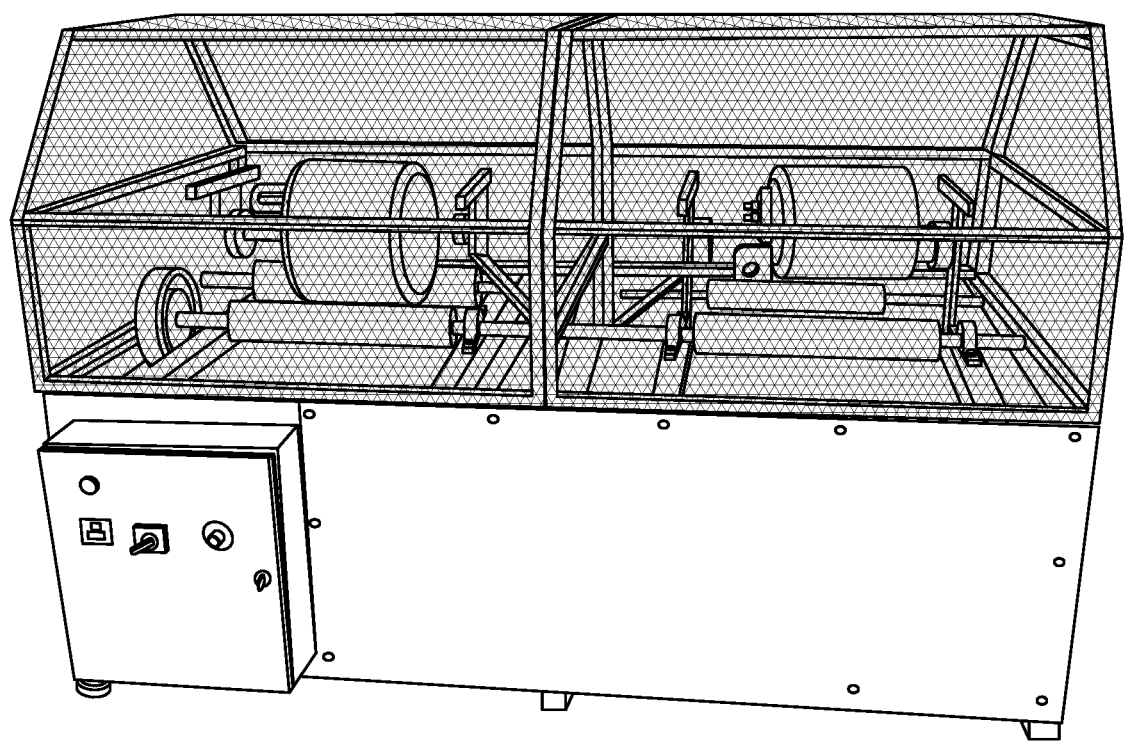
FIG. 4 is a pictorial view of a mechanical ball mill with two mills operating simultaneously.
Figure 5:
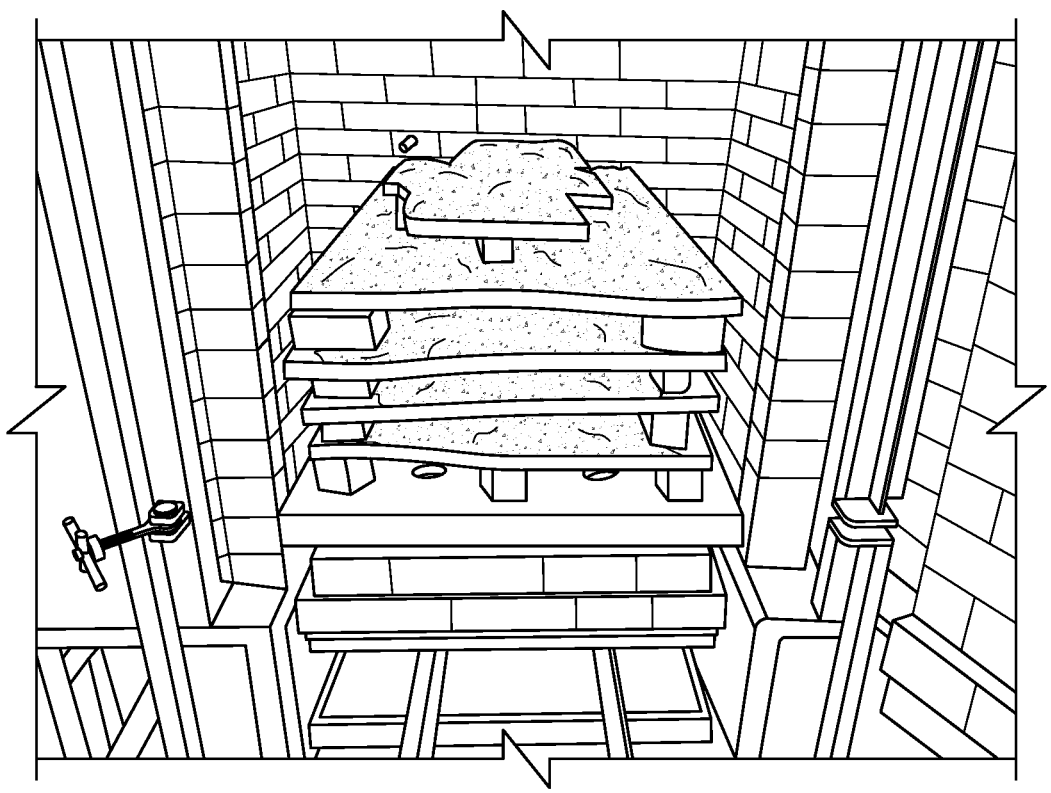
FIG. 5 is an image of ground POFA after oven drying and grinding but before heat treatment in a gas-operated furnace, where the POFA has a black appearance.
Figure 6:
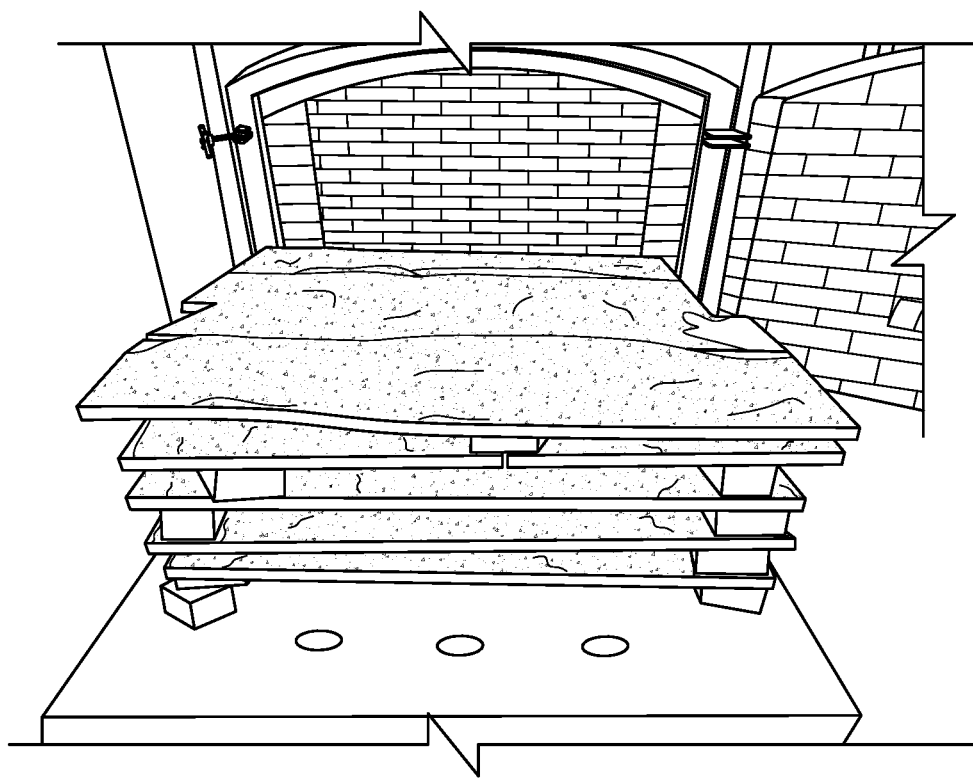
FIG. 6 is an image of calcined POFA (after heat treatment in a gas-operated furnace), where the POFA has a grey appearance.

POFA was the only aluminosilicate source material and was obtained from United Palm Oil Mill Sdn. Bhd. in Nibong Tebal, Penang, Malaysia. It is a by-product from the combustion of empty palm fruit bunches, palm kernel shells and fibers; normally used to heat the boiler for electrical energy generation in the palm oil mill. FIG. 1 shows a typical dumping site for raw POFA, which is a combination of well-burnt ashes and partially burnt palm shells and fibers. The raw POFA particles are predominantly dark in color due to the presence of high carbon amounts from incomplete burning of the residue. To adequately harness the inherent benefits of POFA, POFA was treated to remove unwanted residue following the procedure highlighted in FIG. 2. This was achieved by drying the relatively moist raw POFA in an oven at 100±5° C. for 24 hours, as shown in FIG. 3 to remove the moisture and to allow for ease of particles movement through the sieves. After drying, the dried POFA was sieved through a set of sieves (600 μm and 300 μm) to remove coarser and unwanted materials. Subsequently, after sieving, the sieved POFA was ground by a mechanical ball mill. The mechanical ball mill shown in FIG. 4 has an approximately 7 kg-controlled capacity for each cycle to achieve an efficient grinding of POFA. It holds 150 steel balls of sizes ranging from 6 mm to 32 mm and rotating at speed of 180 rpm. Grinding was done to decrease the particle size of POFA and to increase its surface area, which ultimately led to improved pozzolanic reactivity. At this stage, the POFA material is physically processed but not thermally treated, hence referred to as ground POFA (GPOFA). To remove unburnt carbon, prevent glassy phase crystallization and agglomeration of particles, the ground POFA was heated at 550° C. in a gas-powered furnace for 90 min. After this calcination process, there is a change in color from black (ground POFA, FIG. 5) to grey (calcined POFA, FIG. 6) due to the removal of carbon responsible for the black color. To further improve the surface area and specific gravity, the calcined POFA is ground for another round in the ball mill to provide treated palm oil fuel ash (TPOFA). This is because the particles characterized by low specific gravity have had improved fineness and particle size, hence increased specific gravity. The POFA treatment procedure adopted was due to the highest improvement achieved, which was measured by the least amount of unburnt carbon content. The synthesis of alkali-activation of POFA material will improve because of the carbon content reduction. The loss on ignition (LOI) values reduced from 26% to 2.3% after heat treatment, a sign of low unburnt residue in the POFA. The reduction in the LOI value is compensated for by an increase in the mass percentages of other oxides.

The particle size distribution of the final stage of preparation of POFA was determined using Laser Particle Sizer Analysette 22 MicroTec plus particle size analyzer (PSA). The value of the surface area was determined using Micromeritics ASAP2020 BET using nitrogen gas adsorption. Table 1 shows the oxide compositions and physical properties of TPOFA and GPOFA, which were determined using X-ray fluorescence (XRF) technique. With total oxides of silicon, aluminium and iron of 79.07%, the TPOFA complies with the specification of ASTM C618 class F (ASTM C618 2012).

TABLE 1

Chemical compositions and physical properties of TPOFA and GPOFA

| Property | Value | |
| --- | --- | --- |
| Chemical | TPOFA | GPOFA |
| Silicon dioxide ($SiO_2$), % | 66.91 | 62.74 |
| Aluminum oxide ($Al_2O_3$), % | 6.44 | 6.32 |
| Ferric oxide ($Fe_2O_3$), % | 5.72 | 4.87 |
| Calcium oxide (CaO), % | 5.56 | 4.94 |
| Magnesium oxide (MgO), % | 3.13 | 2.51 |
| Sodium oxide ($Na_2O$), % | 0.19 | 0.15 |
| Potassium oxide ($K_2O$), % | 5.20 | 4.69 |
| Sulfur oxide ($SO_3$), % | 0.33 | 0.26 |
| Phosphorus ($P_2O_5$), % | 3.41 | 3.72 |
| LOI, % | 2.3 | 10.13 |

TABLE 1-continued

Chemical compositions and physical properties of TPOFA and GPOFA

| Property | Value | |
| --- | --- | --- |
| Chemical | TPOFA | GPOFA |
| Physical | | |
| Specific gravity (g/cm$^3$) | 2.53 | 2.87 |
| Median particle size $d_{50}$ (μm) | 1.068 | 2.96 |
| Specific surface area (m$^2$/g) | 1.521 | 1.683 |

Alkaline Activators

A mixed solution of $NaOH_{(aq)}$ and $Na_2SiO_3$ was used as an activator in the developed alkali-activated mortar (AAM). Sodium hydroxide is cheap material and it is widely available, making it a choice activator in the alkaline activation of the precursor material, in this case POFA. However, the corrosive nature of the highly alkaline alkali hydroxides presents handling issues. Commercial grade sodium hydroxide pellets with 97% purity and specific gravity of 2.13 were used in the preparation of sodium hydroxide solution. The $NaOH_{(aq)}$ solution was prepared by dissolving either the flakes or pellets in water. The mass of NaOH solids (flakes or pellets or in a solution) varied depending on the concentration of the solution expressed in terms of desired molarity of the solution. For example, 8M NaOH solution was prepared by dissolving 319.976 g of NaOH (in flake or pellet form) in one liter of distilled water.

Sodium silicate ($Na_2SiO_3$), also known as water glass, was also used in combination with NaOH as an alkali activator. The silica modulus ($SiO_2$-to-$Na_2O$ (or $K_2O$) ratio) varies from 1.5 to 4. The hydrates of $Na_2SiO_3$ have the formula $Na_2SiO_3 \cdot nH_2O$ where n=5, 6, 8, or 9. Available water glass has a silica modulus of 3.3 and holds 36-38% solids.

Water

Potable water, whose physiochemical composition shown in Table 2, was used in the developed alkali-activated mortar.

TABLE 2

Physicochemical analysis of potable water used

| Analysis | Analytical Methods | Limits* | Results |
| --- | --- | --- | --- |
| Color | Spectrometric | 5.0 TCU | <1 TCU |
| Turbidity | Photometric | 5.0 NTU | <1 NTU |
| pH @ 25 deg C. | Electrometric | 5 to 7 | <1 to 7 |
| Chloride | Argentometric | 250 mg/L | <1 mg/L |
| Iron | Photometric (Phematroline method) | 1.0 mg/L | <0.05 mg/L |
| Manganese | Photometric (Persulfate method) | 0.4 mg/L | <0.01 mg/L |
| Sulfate | Photometric | 250 mg/L | <25 mg/L |
| Nitrate | Photometric (Diazotization) | 50 mg/L | <1 mg/L |
| Lead | Direct flame | 0.01 mg/L | <0.007 mg/L |
| Arsenic | Hydride generation | 0.05 mg/L | <0.01 mg/L |
| Cadmium | Direct flame | 0.003 mg/L | <0.002 mg/L |
| Total Dissolved Solids | Gravimetric | 500 mg/L | <6 mg/L |

Limits* means recommended contaminant levels

Fine Aggregate

Figure 7:
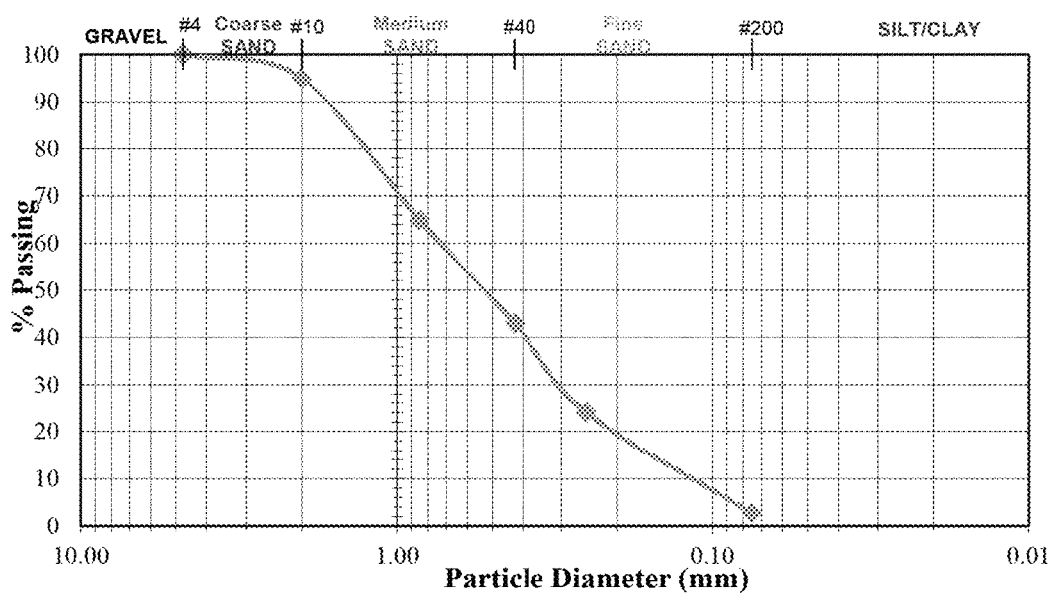
FIG. 7 is a graph showing the gradation of a fine aggregate used in the Examples.

In the design of alkali-activated mortar/concrete, selection of aggregate is important as most of the matrix volume is occupied by aggregates. The gradation of fine aggregate as shown in FIG. 7 meets the requirement specified in ASTM C33/C33M-18 (2018). The fine aggregate used was dune sand with fineness modulus of 1.85 and specific gravity in the saturated and surface dry (SSD) condition of 2.62.

Superplasticizer

A commercially available polycarboxylic ether based superplasticizer (SP), MASTERGLENIUM 51, available from BASF, satisfying the ASTM C494/C494M-17 (2017) was used to modify the workability and to achieve adequate rheological properties of the developed alkali-activated mortar. It is a chloride-free super plasticizing admixture.

Mixture Proportioning

The alkali-activated mortar mixture in Table 3 was prepared with 100% POFA as the binder with a constant fine aggregate (FA)/POFA ratio of 1.5. The alkaline activators used were prepared from a mixture of $NaOH_{(aq)}$ (NH) and $Na_2SiO_{3(aq)}$ (NS) with activator's relative proportion—($Na_2SiO_{3(aq)}$/xM $NaOH_{(aq)}$: [x=10, 12 and 14 M]) whose ratios are 2.5, 2 and 1. The NaOH pellets were measured before dissolution and placed in a beaker depending on the required molarity; distilled water was then added and thoroughly mixed. For instance, 10 M $NaOH_{(aq)}$ is prepared by measuring 399.97 g of NaOH pellets into a beaker and distilled water added to the 1000 ml mark on the beaker. The solution, which is exothermic, is stirred until all the pellets have dissolved and a clear solution obtained. After preparation, the solution is allowed to cool down to prevent the alkaline activation process from thermal interference from the exothermic $NaOH_{(aq)}$ solution. Based on the alkali activator ratio, the $Na_2SiO_{3(aq)}$ solution was added to the measured $NaOH_{(aq)}$ solution and then mixed for several minutes.

TABLE 3

Mixture design for the developed mortar with $Al(OH)_3$

| Mixtures | NS/NH | (NS + NH)/POFA | Sand/POFA | Molarity | $Al(OH)_3$/POFA |
|---|---|---|---|---|---|
| M1 | 2.5 | 0.4 | 1.5 | 10 | 0.02 |
| M2 | 2.5 | 0.5 | 1.5 | 10 | 0.02 |
| M3 | 2.5 | 0.6 | 1.5 | 10 | 0.02 |
| M4 | 2 | 0.4 | 1.5 | 10 | 0.02 |
| M5 | 2.5 | 0.4 | 1.5 | 12 | 0.02 |
| M6 | 2 | 0.4 | 1.5 | 12 | 0.02 |

Mixing Procedure

An approximate unit weight of between 2200-2300 kg/m³ for the POFA alkali-activated mortar is quite comparable to that of typical Portland cement concrete. Two stages of mixing were carried out; firstly, POFA, sand and $Al(OH)_3$ (for the control mixtures, $Al(OH)_3$ was absent) were thoroughly dry-mixed to remove air pockets using a Hobart floor mixer for 2 minutes to get a uniform mixture of dry materials. Secondly, a mixture of $Na_2SiO_{3(aq)}$ (NS) and $NaOH_{(aq)}$ (NH) was added, allowed to mix for 5 mins and then water and/or superplasticizer was added to improve its consistency. The mixture was allowed to mix for another 4-5 mins making the overall average mixing time to be approximately 12 mins. Intermittently, the mixer was stopped to scrap manually the solid materials sticking to the bottom of the bowl. The mixing was continued and was stopped when homogeneity and consistency of the mortar mixture had been reached after 1-2 mins. As the flowability was important for the fresh POFA AAM mixture, workability was assessed using the flow table test. After ensuring a workable mixture, two layers of fresh mortar were cast into 50 mm oil-smeared cubic molds. The mold was vibrated for each layer of two for 15 s, after which the molds were wrapped in polythene sheets to reduce moisture loss.

Casting and Curing of Mortar Specimens

For the compressive strength, the mixtures were cast in two layers into 50 mm×50 mm×50 mm oil smeared steel molds. Each layer was compacted on a vibrating table for 1-2 mins after which the fresh POFA alkali-activated mortar (POFA-engineered cementitious composite (EACC)) samples were covered in vinyl bags to prevent moisture loss and left in the laboratory at 25° C. for 24 hours prior to demolding. The specimens were demolded and placed in vinyl plastic bags prior to curing in an oven at 60±5° C. for 24 h. This was to aid in the alkaline activation reaction for early strength increase. After the heat curing, the hardened samples were subsequently allowed to cool down in the laboratory until predetermined ages for the test. The same procedures were adopted for the tensile and flexural strength specimens.

Test Methods

The optimized POFA alkali-activated concrete specimens were prepared and evaluated to determine the following properties according to standard procedures at appropriate curing periods.
  i) In accordance to ASTM C1437, the fresh properties (workable flow) of the POFA alkali-activated mortar was determined using a flow table test on 50 mm cube specimens of the POFA alkali-activated mortar.
  ii) In accordance to ASTM C39, the compressive strength of 50 mm POFA alkali-activated mortar cube specimens after 7 and 28 days of curing was measured.

Results and Discussion

Fresh Properties of POFA Alkali-Activated Mortar

The fresh properties of the POFA alkali-activated mortar were determined in order to study the effects of water and the commercial superplasticizer (SP) to guide the choice of water or SP in other experimental mixtures. The workable flow spread of mortar was in the range of 110-135±5% for both water and SP, so we settled for water due to cost. In addition, the spread values qualify the mixtures for hardened properties evaluation.

Compressive Strength of POFA Alkali-Activated Mortar

For the compressive strength of the hardened POFA alkali-activated mortar, three different age (3, 14, and 28 days) records were taken to study the influence of time on the strength development. As shown in Table 4, the developed POFA alkali-activated mortar without $Al(OH)_3$ achieved a minimum and maximum 28-day compressive strength of 23 and 25 MPa, respectively. Upon the addition of $Al(OH)_3$, there was an approximately 35% increase in strength with 2% addition of $Al(OH)_3$ in one of the mixtures (M4 in Table 4). This is very much dependent on sodium hydroxide concentration, sodium silicate to sodium hydroxide ratio, alkaline activator/POFA ratio, sand/POFA and the chemical properties of POFA as a binder. Upon the modest addition of $Al(OH)_3$, there was an adjustment particularly in the $Al_2O_3$ content of POFA material, which directly led to the microstructural transformation of the POFA binder as the percentage of $Al(OH)_3$ increases. The microstructural transformations were advantageous with modest addition of $Al(OH)_3$, however, became non-beneficial as the addition of $Al(OH)_3$ increases. This is beneficial economically for the invention as the cost of the mortar even with the $Al(OH)_3$ strength enhancer is still well below the cost incurred in the production of OPC containing mortars/concretes.

TABLE 4

Compressive strength of the developed alkali-activated mortar with or without Al(OH)$_3$

| Mixtures | NS/NH | (NS + NH)/POFA | Sand/POFA | Molarity | Al(OH)$_3$/POFA | Without Al(OH)$_3$ | With Al(OH)$_3$ | % Increase |
|---|---|---|---|---|---|---|---|---|
| M1 | 2.5 | 0.4 | 1.5 | 10 | 0.02 | 25.14 | 30.07 | 16.40 |
| M2 | 2.5 | 0.5 | 1.5 | 10 | 0.02 | 23.83 | 30.46 | 21.78 |
| M3 | 2.5 | 0.6 | 1.5 | 10 | 0.02 | 23.33 | 26.56 | 12.18 |
| M4 | 2 | 0.4 | 1.5 | 10 | 0.02 | 23.17 | 35.53 | 34.78 |
| M5 | 2.5 | 0.4 | 1.5 | 12 | 0.02 | 24.96 | 31.24 | 20.11 |
| M6 | 2 | 0.4 | 1.5 | 12 | 0.02 | 24.22 | 25.00 | 3.12 |

Merits of the Developed Alkali-Activated Mortar

I. The palm oil fuel ash (POFA) alkali-activated mortar (improved with Al(OH)$_3$) of the present disclosure comes low-priced in comparison with the cost of OPC mortar or concrete, and can be used in structural and infrastructural applications.

II. With respect to the environment, the palm oil fuel ash (POFA) alkali-activated mortar (improved with Al(OH)$_3$) of the present disclosure is sustainable and eco-friendly due to the huge availability of POFA and significantly low carbon footprint in line with the requirements of the UN sustainable development goal number 13.

III. With respect to United Nation sustainable development goals, the use of POFA reduces not only the cost of materials but also significantly reduces the carbon footprint because of the complete replacement of Portland cement as cementitious binder.

IV. The beneficial use of POFA agricultural wastes in the invention conserves hectares of lands currently used for landfills, allowing the lands to be used constructively, e.g., for the development of roads, buildings etc.

V. The POFA aluminosilicate materials used in the development mortar moved from being a harmful landfill material to a beneficial material used in the invention.

VI. The mortar of the present disclosure proved to have excellent fresh and hardened properties, in some case achieving a compressive strength of almost 36 MPa when enhanced with a modest percentage of Al(OH)$_3$. Bearing in mind this is mortar and not concrete, the achieved strength is high and impressive for mortar.

The invention claimed is:

1. An iron oxide-containing mortar composition, comprising:
a treated palm oil fuel ash as a binder, wherein the treated palm oil fuel ash is the only binder present and has a median particle size ($d_{50}$) of 0.5 to 2.0 μm and contains Fe$_2$O$_3$ in an amount of 3 to 7 wt. % based on the total weight of the treated palm oil fuel ash;
a fine aggregate;
an alkali activator comprising an aqueous solution of sodium hydroxide and sodium silicate; and
aluminum hydroxide as a strength enhancer, wherein the aluminum hydroxide is the only strength enhancer present, and
wherein a weight ratio of the aluminum hydroxide to the treated palm oil fuel ash is 0.01:1 to 0.05:1.

2. The mortar composition of claim 1, wherein the treated palm oil fuel ash is present in an amount of 20 to 30 wt. %, based on a total weight of the mortar composition.

3. The mortar composition of claim 1, wherein the treated palm oil fuel ash comprises, as constituent oxides, 66 to 68 wt. % SiO$_2$, 6 to 7 wt. % Al$_2$O$_3$, 5 to 6.5 wt. % Fe$_2$O$_3$, 5 to 6 wt. % CaO, 2.5 to 3.5 wt. % MgO, 4.5 to 6 wt. % K$_2$O, 0.3 to 0.35 wt. % SO$_3$, 0.18 to 0.2 wt. % Na$_2$O, and 3 to 4 wt. % of P$_2$O$_3$, each based on a total weight of the treated palm oil fuel ash.

4. The mortar composition of claim 1, wherein a weight ratio of the fine aggregate to the treated palm oil fuel ash is 1:1 to 2:1.

5. The mortar composition of claim 1, which has weight ratio of water to the treated palm oil fuel ash of 0.2 to 0.98.

6. The mortar composition of claim 1, which consists of the treated palm oil fuel ash, the fine aggregate, sodium hydroxide, sodium silicate, aluminum hydroxide, and water.

\* \* \* \* \*